United States Patent
Sarkar et al.

(10) Patent No.: US 10,451,708 B2
(45) Date of Patent: Oct. 22, 2019

(54) BACKTRACKING INDOOR TRAJECTORIES USING MOBILE SENSORS

(71) Applicant: Tata Consultancy Services Limited, Mumbai (IN)

(72) Inventors: Sourjya Sarkar, Kolkata (IN); Avik Ghose, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 430 days.

(21) Appl. No.: 15/087,393

(22) Filed: Mar. 31, 2016

(65) Prior Publication Data

US 2016/0291121 A1 Oct. 6, 2016

(30) Foreign Application Priority Data

Apr. 1, 2015 (IN) .......................... 1406/MUM/2015

(51) Int. Cl.
| | |
|---|---|
| *G01S 3/02* | (2006.01) |
| *G01S 5/02* | (2010.01) |
| *G01C 21/20* | (2006.01) |
| *H04W 4/02* | (2018.01) |
| *H04W 4/029* | (2018.01) |

(52) U.S. Cl.
CPC .......... *G01S 5/0252* (2013.01); *G01C 21/206* (2013.01); *G01S 5/0278* (2013.01); *H04W 4/025* (2013.01); *H04W 4/029* (2018.02); *G01S 5/0263* (2013.01)

(58) Field of Classification Search
CPC .... G01S 5/0252; G01S 5/0278; G01S 5/0263; H04W 4/029; H04W 4/025; G01C 21/206

USPC .......................................... 342/451; 701/408
See application file for complete search history.

(56) References Cited

U.S. PATENT DOCUMENTS

| | | | |
|---|---|---|---|
| 7,250,907 B2 | 7/2007 | Krumm et al. | |
| 8,498,811 B2* | 7/2013 | Lundquist | G01C 21/005 701/434 |
| 8,583,400 B2 | 11/2013 | Thrun et al. | |
| 8,594,701 B2* | 11/2013 | Pakzad | H04W 64/00 455/404.2 |
| 8,660,581 B2* | 2/2014 | Davis | H04W 4/023 455/456.3 |
| 9,116,000 B2* | 8/2015 | Pakzad | G01C 21/206 |
| 9,148,764 B2* | 9/2015 | Das | G01S 5/0252 |
| 9,304,207 B2* | 4/2016 | Shingyoji | G01C 21/165 |
| 9,892,553 B2* | 2/2018 | Yoo | G06T 17/05 |
| 9,955,309 B2* | 4/2018 | Wirola | H04W 64/00 |

(Continued)

FOREIGN PATENT DOCUMENTS

EP          1109031    *  6/2001    ............. G01C 21/28

*Primary Examiner* — Chuong P Nguyen
(74) *Attorney, Agent, or Firm* — Finnegan, Henderson, Farabow, Garrett & Dunner LLP (57) ABSTRACT

The present subject matter relates to a computing device (104) and method intended to provide fine-grained continuous location tracking for non-real time uses (e.g., for retracing the movement of office employees). As per the subject matter, the knowledge of an office layout is combined with the application of particle filters (PFs) over inertial tracking (using compass, accelerometer and gyroscope sensors) data. Viterbi-based path-likelihood maximization is integrated with PF framework to progressively reduce the uncertainty in the movement track of an individual computing device (104).

18 Claims, 7 Drawing Sheets

(56) References Cited

U.S. PATENT DOCUMENTS

| | | | |
|---|---|---|---|
| 2011/0172916 A1* | 7/2011 | Pakzad | G01C 21/14 |
| | | | 701/533 |
| 2012/0290254 A1* | 11/2012 | Thrun | G01C 21/16 |
| | | | 702/150 |
| 2013/0016012 A1* | 1/2013 | Beauregard | H04W 64/00 |
| | | | 342/450 |
| 2013/0122935 A1* | 5/2013 | Das | G01S 5/0252 |
| | | | 455/456.3 |
| 2013/0191019 A1* | 7/2013 | Pakzad | G01C 21/206 |
| | | | 701/454 |
| 2014/0073345 A1 | 3/2014 | Chintalapudi et al. | |
| 2015/0198695 A1* | 7/2015 | Waters | G01S 19/48 |
| | | | 342/357.42 |
| 2017/0241787 A1* | 8/2017 | Trigoni | G01C 21/12 |
| 2018/0103351 A1* | 4/2018 | Emmanuel | H04W 4/04 |

* cited by examiner

BACKTRACKING INDOOR TRAJECTORIES USING MOBILE SENSORS

PRIORITY CLAIM

This U.S. patent application claims priority under 35 U.S.C. § 119 to: India Application No. 1406/MUM/2015, filed on 1 Apr. 2015. The entire contents of the aforementioned application are incorporated herein by reference.

TECHNICAL FIELD

This disclosure relates generally to location determination systems, and more particularly to systems and methods for backtracking user's movement trajectories using mobile sensors.

BACKGROUND

Localization refers to a process by which a location is determined of people, places, and objects of interest is determined. Outdoor localization, for example, through global positioning systems (GPS) is prevalent. However, indoor localization is not common, partly due to the attenuation of GPS signal by construction material of a building due to which the a location determination system loses power and due to the spatial granularity requirements that place a burden on the location determination system to achieve fairly high location accuracy. For example, while a three meter location error outdoors may still indicate the same street, a three meter location error in an indoor environment may mean an entirely different room in a building, which would render the location based services (LBS) application requiring high-level accuracy inoperable. Further, conventional location determination systems include sensors, beacons, and transponders for the indoor localization of object devices. However, these systems require the installation of a plurality of electronic devices or indoor base stations in order to work and require complicate additional hardware in the object devices.

SUMMARY

Embodiments of the present disclosure present technological improvements as solutions to one or more of the above-mentioned technical problems recognized by the inventors in conventional systems.

In an aspect, there is provided a computing device for backtracking user's movement trajectory, the computing device comprising: a processor; a particle filtering module, coupled to the processor, to apply a particle filter on an indoor map for estimating user's movement trajectory, based on accelerometer information and heading information associated with the computing device, the computing device being transportable by a user, wherein the accelerometer information and the heading information are based on reading of sensor data from each of a plurality of sensors of the computing device; a backtracking module, coupled to the processor, to apply the particle filter on the indoor map for performing a Viterbi-based backtracking of the user's movement trajectory on the indoor map.

In an embodiment, the plurality of sensors comprise accelerometer, compass magnetometer, and gyroscope, wherein the accelerometer provides an acceleration data for estimating the accelerometer information, and the compass magnetometer and the gyroscope provide an orientation data, and wherein the heading information is estimated from the acceleration data and the orientation data.

In an embodiment, the computing device described herein above further comprises a preprocessing module to: identify the indoor map of an indoor space based on the accelerometer information and the heading information; and preprocess the indoor map, wherein the indoor map includes a plurality of physical constraints; wherein the preprocessing module preprocesses the indoor map by uniformly dividing the indoor map into equal size cells, and wherein cells respecting one of the plurality of constraints are labeled as valid cells and cells violating one of the plurality of constrains are labeled as invalid cells.

In an embodiment, the particle filtering module estimates the user's movement trajectory by: determining a course-level initial location of the computing device on the indoor map; uniformly distributing particles over the determined initial location on indoor map; propagating the distributed particles based on the sensor data and the plurality of constraints; progressively updating the distribution of particles on the indoor map, based on validity of the propagated particles; and based on the progressive updating, estimating the user's movement trajectory.

In an embodiment, the backtracking module is configured to: estimate a transition probability matrix of valid particles by taking into account estimates of transition probabilities of the valid particles at each moving step of the user carrying the computing device, wherein the valid particles are particles lying in the valid cells; and estimate observation density matrix of the valid particles by taking into account estimates of observation densities of the valid particles at each moving step of the user carrying the computing device.

In an embodiment, the backtracking module estimates the transition probability matrix and the observation density matrix, in parallel to the estimation of the user's movement trajectory.

In an embodiment, the backtracking module performs the Viterbi-based backtracking by: using the particle filer to combine identified valid cells, the transition probability matrix, and the observation density matrix, wherein the particle filter is a real-time Bayesian tracking algorithm; based on combination, computing by a Viterbi algorithm a most probable sequence of the identified valid cells that explains inertial measurements represented by each valid particle; and backtracking the user's movement trajectory on the indoor map of the indoor space, based on the most probable sequence of the valid cells.

In an embodiment, an output of the Viterbi algorithm is a sequence of the valid cells on the indoor map.

In an embodiment, the Viterbi-based backtracking is performed offline.

In an embodiment, the computing device further corrects estimated state when particles are abruptly generated at invalid cells.

In another aspect, there is provided a method for backtracking user's movement trajectories, the method comprising: reading sensor data from each of a plurality of sensors of a computing device, the computing device being transportable by a user, wherein based on the sensor data accelerometer information and heading information of the computing device are estimated; applying, by a processor, a particle filter on an indoor map of an indoor space for estimating the user's movement trajectories on the indoor map, based on the accelerometer information and the heading information; and applying, by the processor, the particle filter on the indoor map for performing a Viterbi-based backtracking of the user's movement trajectories on the indoor map.

In an embodiment, the plurality of sensors comprise accelerometer, compass magnetometer, and gyroscope, wherein the accelerometer provides an acceleration data for estimating the accelerometer information, and the compass magnetometer and the gyroscope provide an orientation data, and wherein the heading information is estimated from the acceleration data and the orientation data.

In an embodiment, the method described herein above further comprises identifying the indoor map of the indoor space based on the accelerometer information and the heading information; and preprocessing the indoor map, wherein the indoor map includes a plurality of physical constraints; wherein the preprocessing comprising uniformly dividing the indoor map into equal size cells, and wherein cells respecting one of the plurality of constraints are labeled as valid cells and cells violating one of the plurality of constraints are labeled as invalid cells.

In an embodiment, the method further comprises determining a course-level initial location of the computing device on the indoor map; uniformly distributing particles over the determined initial location on the indoor map; propagating the distributed particles based on the sensor data and the plurality of constraints; progressively updating the distribution of particles on the indoor map, based on validity of the propagated particles; and based on the progressive updating, estimating the user's movement trajectory.

In an embodiment, the method further comprises estimating a transition probability matrix of valid particles by taking into account estimates of transition probabilities of the valid particles at each moving step of the user, wherein the valid particles are particles lying in the valid cells; and estimating observation density matrix of the valid particles by taking into account estimates of observation densities of the valid particles at each moving step of the user.

In an embodiment, the method further comprises estimating the transition probability matrix and the observation density matrix, in parallel to the estimation of the user's movement trajectory.

In an embodiment, the method further comprises using the particle filer to combine identified valid cells, the transition probability matrix, and the observation density matrix, wherein the particle filter is a real-time Bayesian tracking algorithm; based on combination, computing by a Viterbi algorithm a most probable sequence of the identified valid cells that explains inertial measurements represented by each valid particle, wherein an output of the Viterbi algorithm is a sequence of valid cells on the indoor map; and backtracking the user's movement trajectory on the indoor map of the indoor space, based on the most probable sequence of the valid cells.

In an embodiment, the method further comprises correcting estimated state when particles are abruptly generated at the invalid cells.

In yet another aspect, there is provided a non-transitory computer-readable medium comprising instructions executable by a processor to: apply a particle filter on an indoor map (302, 402) for estimating user's movement trajectory, based on accelerometer information and heading information associated with the computing device (104), the computing device (104) being transportable by a user, wherein the accelerometer information and the heading information are based on reading of sensor data (224) from each of a plurality of sensors (208) of the computing device (104); and apply the particle filter on the indoor map (302, 402) for performing a Viterbi-based backtracking of the user's movement trajectory on the indoor map (302, 402).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DETAILED DESCRIPTION

Methods and systems for backtracking user's movement trajectories are described herein. The methods and systems of the present subject matter can be implemented on various computing devices running an unsupervised indoor location (UIL) application as described herein. Through the UIL application, a user's location within a building or other indoor environment can be tracked or localized upon the permission of the user. Localization of the user can be accomplished through unsupervised techniques. That is, landmarks in the indoor environment are not required to be labeled, nor they need to be, for carrying out localization.

Further, in the description hereinafter of the present subject matter and without any limitation, the term 'computing device' may be understood to refer to a smartphone, a mobile phone, a hand-held device, a tablet, a netbook, a laptop, a personal digital assistant (PDA), a notebook, and other portable computing device. Yet further, in view of the description of term 'computing device', the term computing device and mobile device are used interchangeably in the description hereinafter.

Location information of the computing devices may be employed to locate people, places, and objects of interest. Beyond providing access to current status of people and objects, the location information can support presence-forecasting services, which services provide information about a user's future, presence, or availability. In other applications, the location information is also useful for identifying the best way to relay notifications to user, given computing device availabilities and the cost of interruption associated with different contexts. The location information may also be harnessed for a task of marshaling a set of nearby computing devices or device components. In yet other applications, it is desirable to have the location information for applications such as safety, e-business, gaming, directions, or the like.

Outdoor localization applications can rely on decoding timing signals from GPS (Global Positioning Service) or GLONASS (Global Navigation Satellite System) satellite navigation systems to obtain high-accuracy location information. Unfortunately, no comparably ubiquitous means of determining location is available for indoor localization applications. Although specialized indoor localization systems, such as particle filter based indoor trajectory estimation systems employing inertial sensors, can work well indoors, their ideal location accuracy is still compromised due to factors such as noisy sensor readings and drift. Further, an inherent property of the particle filter based indoor trajectory estimation systems is that it is hard to disambiguate between closely resembling indoor turns in which a number of inferred headings or stride lengths are plausible.

Various embodiments and implementations of the present subject matter describe systems and methods for backtracking of a user's movement trajectory. In an implementation, the systems for backtracking of the user's movement trajectory can include an application or "app" running on a computing device readily transportable by the user, for example, adapted to be carried by the user, within an indoor space. In an example, the app can be an unsupervised indoor localization (UIL) app and the computing device can be an electronic device readily transportable by the user. The UIL app can run completely locally on the computing device and can communicate with one or more other devices, for example, a server and/or other computing devices such as portable computers and/or mobile devices, over a network, for example, a communication network or a cellular network.

In an implementation, the UIL app, when executed by a processor of the computing device, direct a processing system of the computing device to: read sensor data from each of the plurality of sensors affixed within the computing device transportable by the user, wherein based on the sensor data, accelerometer information and heading (direction) information of the user are estimated; apply at least a particle filter on an indoor map of an indoor space for estimating user's movement trajectory based on the accelerometer information and heading information; and apply the particle filter on the map to perform a Viterbi-based backtracking of the user's movement trajectory on the indoor map.

In this way, the systems and methods described herein facilitate the integration of Viterbi-based backtracking in a particle filter framework to disambiguate between closely resembling multiple paths inferred from real-time Bayesian tracking algorithms like particle filters. Further, the Viterbi-based backtracking in the particle filter framework progressively reduces the uncertainty in the movement track of an individual computing device. Yet further, the systems and methods described herein for backtracking the user's movement trajectory are completely unsupervised, i.e., the systems and methods described herein don't require manual labeling of actual paths travelled by the user carrying the computing device.

Further, the description hereinafter of the present subject matter includes various specific details to assist in understanding various aspects but these are to be regarded as merely exemplary. Accordingly, those of ordinary skill in the art will recognize that various changes and modifications of the embodiments described herein can be made without departing from the scope and spirit of the present subject matter. In addition, descriptions of well-known functions and constructions may be omitted for clarity and conciseness.

The terms and words used in the following description are not limited to the bibliographical meanings, but, are merely used to enable a clear and consistent understanding of the present subject matter. Accordingly, it should be apparent to those skilled in the art that the following description of exemplary embodiments or implementations of the present subject matter is provided for illustration purpose only and not for the purpose of limiting the present subject matter.

It should be noted that the description merely illustrates the principles of the present subject matter. It will thus be appreciated that various arrangements may also be employed that, although not explicitly described herein, embody the principles of the present subject matter and are included within its spirit and scope. Furthermore, all examples recited herein are principally intended expressly to be only for explanation purposes to aid the reader in understanding the principles of the present subject matter, and are to be construed as being without limitation to such specifically recited examples and conditions. Moreover, all statements herein reciting principles, aspects, and embodiments of the present subject matter, as well as specific examples thereof, are intended to encompass equivalents thereof. The manner in which the methods shall be implemented onto various systems has been explained in detail with respect to the FIGS. 1-5. While aspects of described systems and methods can be implemented in any number of different computing devices and/or configurations, the embodiments are described in the context of the following system(s).

Figure 1:
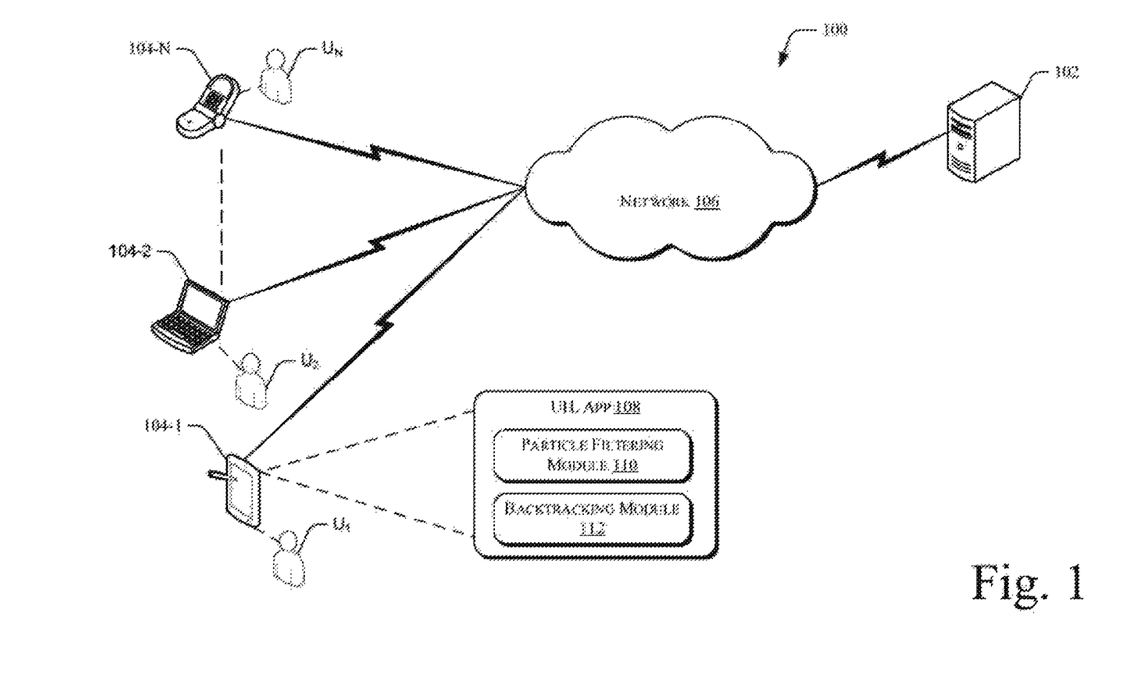
FIG. 1 illustrates an example of location determination system for backtracking a user's movement trajectory, according to an implementation of the present subject matter.

FIG. 1 illustrates, as an example, a system 100 for backtracking user's movement trajectory, in accordance with an implementation of the present subject matter. The system 100 includes a server 102. In an example, the server 102 may be implemented as a workstation, a central server, a distributed server, a network server, and the like.

In an implementation, the server 102 is coupled to a plurality of computing devices 104-1, 104-2 . . . , 104-N, hereinafter collectively referred to as computing devices 104 and individually as computing device 104. In an example, the computing device 104 can be understood to refer to an electronic device readily transportable by a user, for example, adapted to be carried by the user on his person. Examples of the computing device 104 may include, but are not limited to, an ultra mobile personal computer (PC) (collectively UMPC), a tablet PC, a personal digital assistant (PDA), a portable mapping unit, a smartphone, or other similar type of electronic device.

In an implementation, the server 102 and the plurality of computing devices 104 are capable of direct and indirect communication, such as over network 106. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices, etc. In an example, the network 106 may include cellular networks, for example, 2G, 3G, or 4G cellular networks.

In an implementation, the system 100 includes an application or "app" running on, say, a computing device 104-1 readily transportable by a user U1, out of a plurality of users U1, U2, . . . , UN of the computing devices 102, within an indoor space. In an example, the app can be an unsupervised indoor localization (UIL) app 108. The UIL app 108 can run completely locally on the computing device 104-1 and can communicate with one or more other computing devices 104, for example, the server 102 and/or other computing devices 104, such as portable computers and/or mobile devices, over the network 106, for example, a communication network or a cellular network.

Further, in an implementation, the computing device 104-1 includes a plurality of sensors for obtaining at least acceleration data and orientation data, collectively referred to as sensor data. In an example, the plurality of sensors include an accelerometer, a compass magnetometer, and a gyroscope. The accelerometer provides the acceleration data for estimating accelerometer information of the computing device 104 associated with the user. Further, the compass magnetometer and the gyroscope provide orientation data. Based on the orientation data and the acceleration data, a heading (direction) information of the computing device 104 may be estimated. Further, as can be appreciated by those skilled in the art that a particle filter requires the accelerometer information and the heading information for real time tracing of the computing device 104.

In an implementation, based on the accelerometer information and the heading information, the UIL app 108 calls a particle filtering module 110 to apply at least a particle filter on an indoor map of an indoor space for estimating the user's movement trajectory on the indoor map. In an example, the particle filter can be real-time Bayesian tracking algorithm. In said implementation, the estimation of the user's movement trajectory is then backtracked by performing a Viterbi-based backtracking through a backtracking module 112 of the UIL app 108. By performing the Viterbi-based backtracking following the continuous tracing of the user's movement trajectory using the particle filter, a progressive reduction in the uncertainty in the movement trajectory of the user U1 or the computing device 104-1 is achieved. The manner in which the Viterbi-based backtracking is implemented along with a particle filter framework is further described in detail in conjunction with FIG. 2

Figure 2:
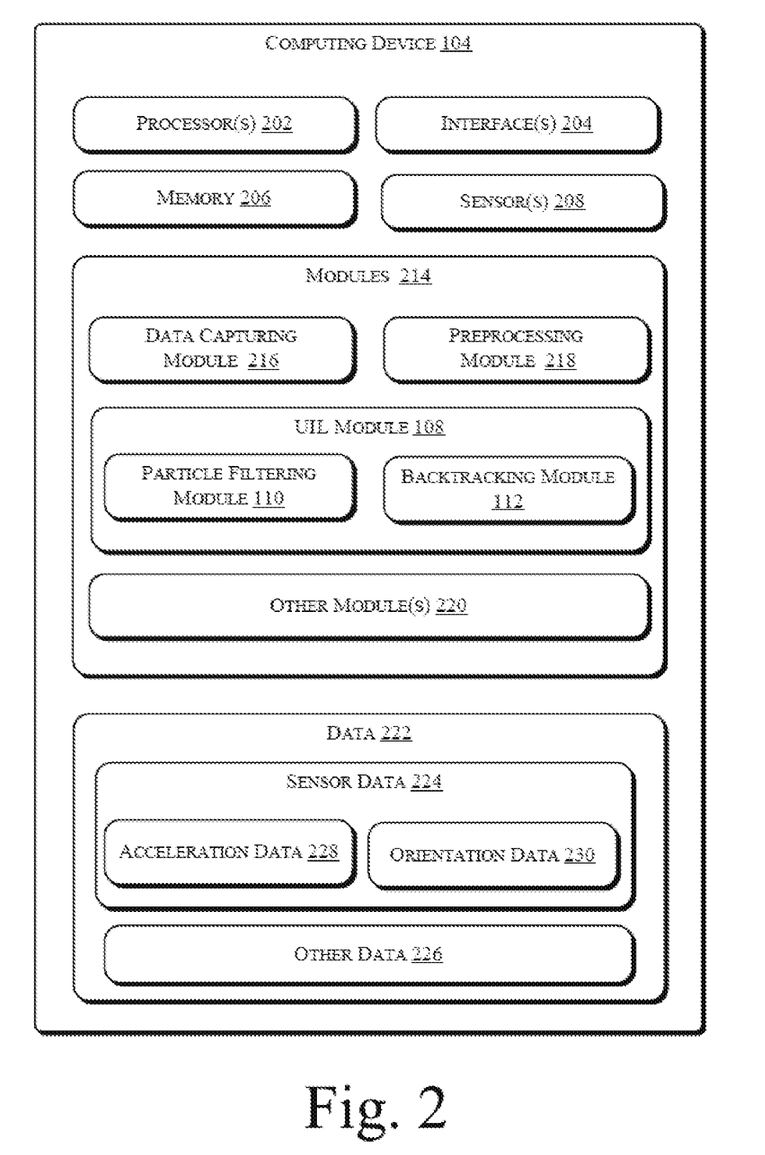
FIG. 2 illustrates an example of computing device for backtracking the user's movement trajectory, according to an implementation of the present subject matter.

FIG. 2 illustrates exemplary components of the computing device 104, in accordance with an implementation of the present subject matter. In an example, the sensing device 104 may include, but are not limited to, an ultra mobile personal computer (PC) (collectively UMPC), a tablet PC, a personal digital assistant (PDA), a portable mapping unit, a smartphone, or other similar type of electronic device.

In one implementation, the computing device 104 includes processor(s) 202, input-output (I/O) interface(s) 204, and a memory 206. The processor(s) 202 are communicatively coupled to the memory 206. The processor(s) 202 may be implemented as one or more microprocessors, microcomputers, microcontrollers, digital signal processors, central processing units, state machines, logic circuitries, and/or any devices that manipulate signals based on operational instructions. Among other capabilities, the processor(s) 202 are configured to fetch and execute computer-readable instructions stored in the memory 206.

The I/O interface(s) 204 may include a variety of software and hardware interfaces, for example, a web interface, a graphical user interface, etc., allowing the computing device 104 to interact with the server 102. Further, the I/O interface(s) 204 may enable the computing device 104 to communicate with other computing devices, such as web servers and external data servers (not shown in figure). The I/O interface(s) 204 can facilitate multiple communications within a wide variety of networks and protocol types, including wired networks, for example LAN, cable, etc., and wireless networks such as WLAN, cellular, or satellite. The I/O interface(s) 204 may include one or more ports for connecting the computing device 104 to a number of devices to or to another server.

The memory 206 can include any computer-readable medium known in the art including, for example, volatile memory (e.g., RAM), and/or non-volatile memory (e.g., EPROM, flash memory, etc.).

In an implementation, the computing device 104 includes sensor(s) 208 for obtaining at least acceleration data and orientation data, collectively referred to as sensor data, when a user carrying the computing device 104 moves in an indoor space. As can be appreciated by those skilled in the art, the sensor(s) 208 can be understood to include to an inertial motion unit that is capable of detecting acceleration and orientation in which the computing device 104 is oriented and moving. The sensor(s) 208 may include one or more gyroscopes, accelerometers, compass magnetometers, or other sensors in reference to gravity and or magnetic north pole. The sensor(s) 208 may be packaged as a single integrated device, or may be affixed as separate components that are interconnected together in the computing device 104. In an example, the sensor data obtained by the sensor(s) 208 is stored locally on the computing device 104, on the server 102, on other computing devices in communication with the computing device 104, or on combination thereof. In another example, the sensor data is collected over the network 106 from multiple computing devices, for example, from multiple users each using a computing device which may be different from that of other users, and stored on the server 102.

In an implementation, the computing device 104 includes module(s) 214. The module(s) 214 further include a data capturing module 216, a preprocessing module 218, the UIL app 108, and other module(s) 220. In an example, the UIL app 108 may include the particle filtering module 110 and the backtracking module 112. Further, the other module(s) 220 further include modules that supplement applications on the computing device 104, for example, modules of an operating system.

Additionally, the computing device 104 further includes the data 222 that serves, amongst other things, as a repository for storing data fetched processed, received, and generated by one or more of the module(s) 214. The data 222 includes, for example, sensor data 224 and other data 226. In an example, the sensor data 224 includes acceleration data 228 and orientation data 230. In an example, the data 222 may be stored in the memory 206 in the form of data structures. Additionally, the data 222 can be organized using data models, such as relational or hierarchical data models.

The computing device 104 having the configurations according to the implementation illustrated in FIG. 2 can be implemented to perform unsupervised indoor localization of a user. The working or operation of the computing device 104, illustrated in FIG. 2, is described in detail with reference to FIG. 3a, FIG. 3b, FIG. 4a, and FIG. 4b in the description hereinafter.

In operation, the indoor localization of a user is measured based on detected initial location of the computing device 104 carried by the user. In typical scenarios, an exact initial location of the computing device 104 is unknown. However, a course-level initial location of the computing device 104 on an indoor map 302, 402 is determined by known methods like WiFi zoning. For example, in FIG. 3a and FIG. 4a, the initial location of the computing device 104 is depicted with a reference symbol 'A'. Once the initial location A is determined, the preprocessing module 218 may identify the indoor map 302, 402 of an indoor space associated with the initial location A. In an example, upon identification, the computing device 104 may access indoor map 302, 402. The indoor map 302, 402 may be stored locally at the computing device 104. Alternatively, no indoor map 302, 402 or a portion of the indoor map 302, 402 may be stored locally at the computing device 104 while bulk of the indoor map 302, 402 is maintained by the server 102. In an example, any additional indoor map 302, 402 may be requested from the server 102 as needed.

Figure 3A:
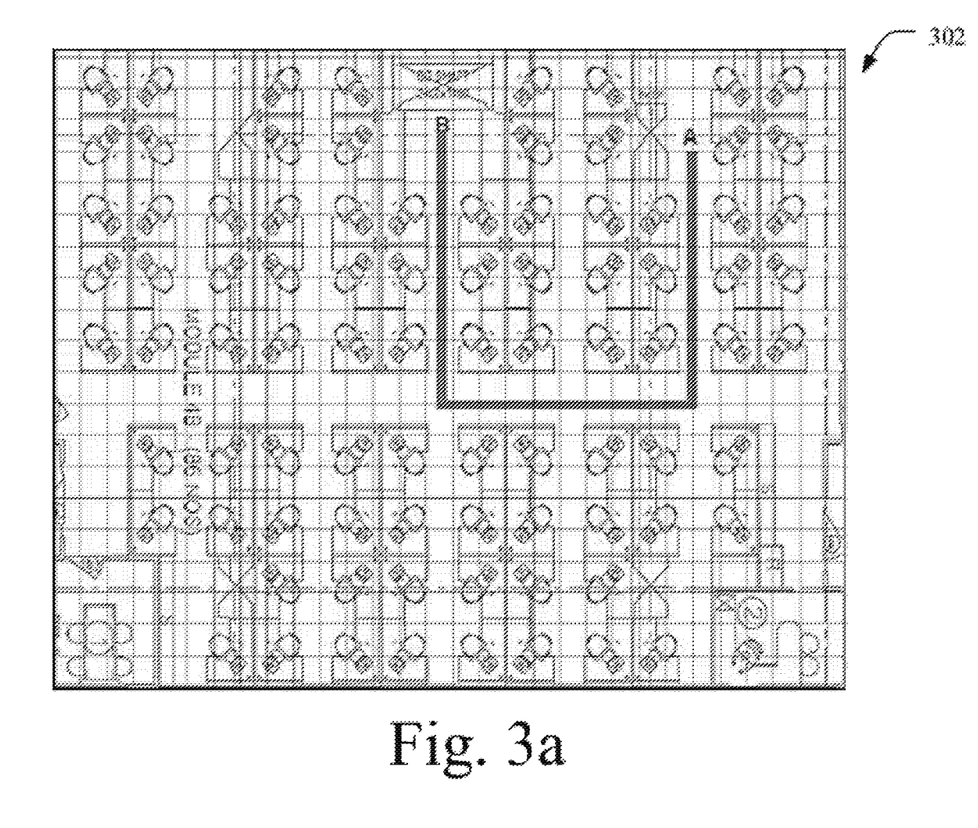
FIG. 3a illustrates a first example of a user's movement trajectory in an indoor space, according to an implementation of the present subject matter.
Figure 4A:
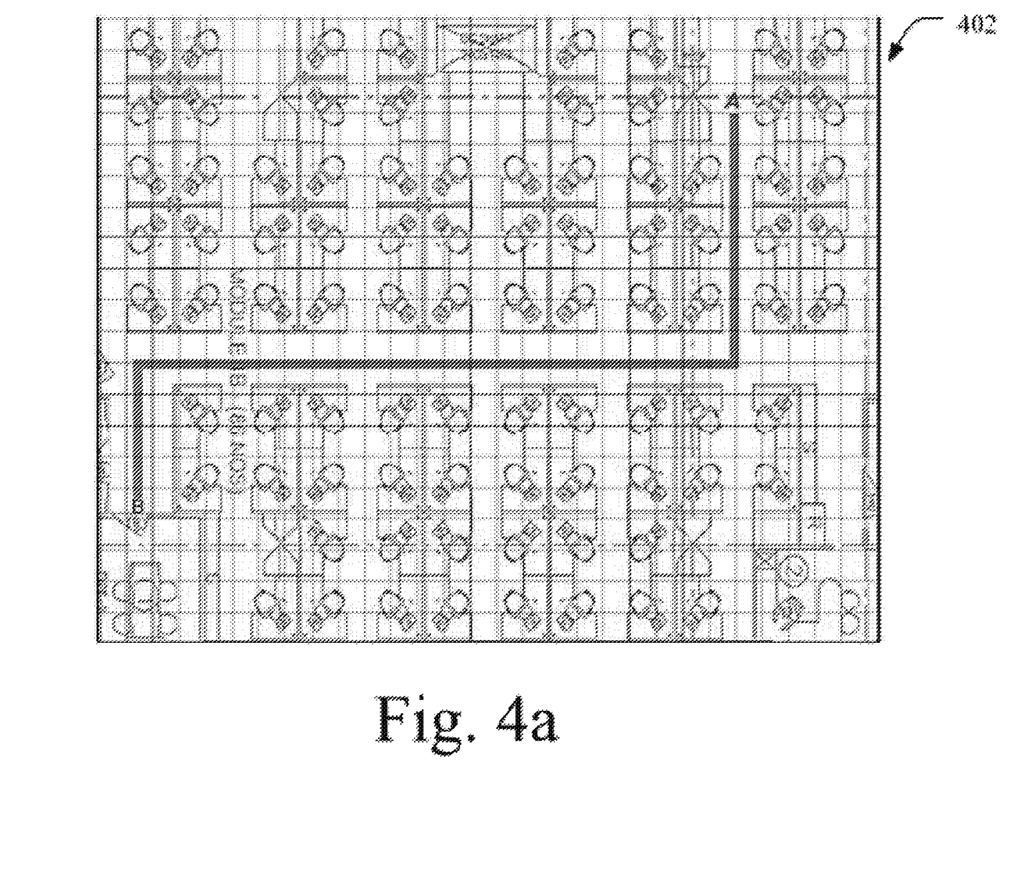
FIG. 4a illustrates a second example of the user's movement trajectory in an indoor space, according to an implementation of the present subject matter.

In an example, the indoor map 302, 402 may include a plurality of constraints. The plurality of constraints may include, for example, walls or rails. The walls may represent locations where a user may not walk within the indoor space, while the rails may represent possible paths within the indoor space.

The indoor map 302, 402 is then, say, offline, preprocessed by the preprocessing module 218. In an example, the preprocessing of the indoor map 302, 402 includes uniform division of an indoor floor of the indoor space on the indoor map 302, 402 into fixed or equal size cells. In an example, each of the cells on the indoor map 302, 402 is uniformly divided into about 0.61 meter square in size. Further, each of the cells corresponds to a specific location on the indoor floor and represents discrete latent states in Bayesian algorithm. In other words, the cells on the indoor map 302, 402 are labeled as valid cells and invalid cells. For example, cells lying in reachable area and respecting one of the plurality of constraints are labeled as 'valid cells', while cells lying in unreachable area and violating one of the plurality of constraints are labeled as 'invalid cells'. In an example, the cells which share a common edge with a valid cell constitute its neighbors as being adjacent cells.

Once the indoor map is divided into valid cells and invalid cells based on the plurality of constraints, the UIL app 108 prompts the user to allow or permit the app for continuous tracking the user's location within the indoor space at each moving step of the user. In an example, upon the receipt of the permission of the user, the UIL app 108 calls the particle filtering module 110 to produce an estimate of the user's location or the user's movement trajectory on the indoor map 302, 402 using at least a particle filter.

In an implementation, for producing the estimate of the user's location or the user's movement trajectory, the particle filtering module 110 uniformly distributes particles over the initial location A of the user on the indoor map 302, 402. As described above, the initial location A of the user is determined by known methods like WiFi zoning. Each of the plurality of particles represents a state of the computing device 104, for example a possible location of the computing device 104 with respect to the indoor map. Once the initial location A is populated by the distributed particles, the particle filtering module 110 propagates the distributed particles based on the sensor data 224 and the plurality of constraints.

In an implementation, the particle filtering module 110 communicates with the data capturing module 216 to receive the sensor data 224 from the sensor(s) 208 affixed to the computing device 104. As used herein the term "affixed" shall be understood to refer to something being attached to directly or indirectly, carried by, or otherwise caused to be collocated with. For example, something that is secured to an article of clothing of a user would be considered to be "affixed" to a user. Further, something that is integrated into a computing device which is carried by, or otherwise caused to be move with, a user would also be considered to be "affixed" to the user, despite the lack of a direct mechanical attachment between the two.

In an example and not by way of limitation, the particle filtering module 110 receives the sensor data 224 at regular time intervals, say, at 5 milliseconds for the computing device 104 with sampling frequency of 200 Hz.

In an example, the sensor(s) 208 includes an accelerometer, a compass magnetometer, and a gyroscope. The accelerometer provides the acceleration data 228 for estimating accelerometer information of the computing device 104 associated with the user. The accelerometer information is used to determine speed of movement of the computing device 104. Further, the compass magnetometer and the gyroscope provide orientation data 230. Based on the orientation data 230 and the acceleration data 228, a heading (direction) information of the computing device 104 may be estimated. The heading information is used for determining the direction in which the computing device 104 is oriented from the initial location A. Further, as can be appreciated by those skilled in the art that a particle filter requires the accelerometer information and the heading information for real time tracing of the computing device 104.

As described earlier, based on the sensor data 224 (including the accelerometer information and the heading information) and the plurality of constraints, the particles distributed over the initial location A of the user are propagated. Based on validity of the propagated particles, the distribution of particles on the indoor map 302, 402 is progressively updated. The progressive updating of the distribution of particles represents the user's movement trajectory, i.e., movement trajectory of the user carrying the computing device 104, within the indoor map 302, 402.

In an implementation, the particle filter is applied on the indoor map 302, 402 to remove particles that would violate one of the plurality of constraints, for example, contacting a wall or moving off or away from the rails. As the user carrying the computing device 104 continues to move in the indoor space, the acceleration data 228 is continuously received, and particles violating one of the plurality of constraints may continue to be removed from the indoor map 302, 402 by the particle filter for estimating the user's movement trajectory on the indoor map 302, 402. Accordingly, the user's movement trajectory can be represented on the indoor map 302, 402 by particles present in the valid cells and that respect one of the plurality of constraints. In an example, particles present in the valid cells and respecting the plurality of constraints may also be referred to as valid particles.

The estimate of the user's movement trajectory on the indoor map 302, 402 is then stored either on computing device 104 or on the server 102.

Further, in an implementation, in parallel to the estimation of the user's movement trajectory, the backtracking module 112 estimates or calculates transition probability matrix and the observation density matrix of the valid particle. For instance, transition probabilities estimation are calculated at instances when the user takes a step (not any regular time interval) on the estimated user's movement path on the indoor map 302, 402. The step-instances are calculated from the acceleration data 228. Such transition probabilities estimations are carried out till the user is in motion. Once the user stops at a cell on the indoor map 302, 402, particles in that cell may be used to determine a current or final location of the computing device 104 carried by the user. For example, in FIG. 3b and FIG. 4b, a possible location represented by remaining particles may be determined to be a final location B of the computing device 104 carried by the user.

The estimation of the transition probabilities of the valid particles at each moving step of the user carrying the computing device 104 is taken into account while estimating a transition probability matrix of all valid particles on the indoor map 302, 402. For example, let a number of valid cells adjacent to a current cell i on the indoor map 302, 402 in a heading range be N' and a number of second order valid adjacent cells be N". An instantaneous transition probability At (i, j) from the current cell i to an adjacent cell j is defined by following equation (1):

$$A^t(i, j) = \begin{cases} \frac{2}{3(N' + N'')}, & \forall j : j \in Adj^1(i) \\ \frac{1}{3(N' + N'')}, & \forall j : j \in Adj^2(i) \\ 0, \end{cases} \quad (1)$$

where Adj1(i) and Adj2(i) are first and second ordered adjacent cells.

In an implementation, a final transition probability matrix taking accounting for estimates at all time instances is given by following equation (2):

$$A(i, j) = \frac{\Sigma_t N_t(i) A^T(i, j)}{\Sigma_{t'} \Sigma_i N_{t'}(i) A^{t'}(i, j)} j \in \{Adj^1(i) \cup Adj^2(i)\} \quad (2)$$

where Nt(i) is a number of particles generated in the current cell i at a time t.

Further, upon estimation of the transition probability matrix, the backtracking module 112 estimates observation density matrix of the valid particles associated with the estimated transition probability matrix, by taking into account estimates of observation densities of the valid particles at each moving step of the user carrying the computing device 104. For example, an observation density of a valid current cell i at a $t^{th}$ time step O(i, t) is simply defined as fraction of a total number of generated particles in the valid current cell i at the time t, as shown below in equation (3):

$$O(i, t) = \frac{N_t(i)}{\Sigma_j N_t(j)} \quad (3)$$

As described earlier, the transition probability matrix and the observation density matrix are calculated for Viterbi decoding while backtracking, in parallel to the process of a particle filter algorithm estimating the user's movement trajectory. That is, the particle filtering module 110 estimates the user's movement trajectory independently.

Once the transition probability matrix and the observation density matrix of particles in the valid cells are estimated, the backtracking module 112 applies the particle filter algorithm to combine identified (current and adjacent) valid cells on the indoor map 302, 402, the transition probability matrix, and the observation density matrix. Using the combination, a Viterbi algorithm computes or decodes a most probable sequence of the valid cells that explains inertial measurements represented by each valid particle. That is, the Viterbi algorithm computes or decodes a most probable sequence of valid cells at each discrete instance of time 't'. Based on the most probable sequence of valid cells, the Viterbi algorithm performs a Viterbi-based backtracking of the user's movement trajectory. In an example, an output of the Viterbi algorithm is a sequence of states, i.e., sequence of valid cells on the indoor map 302, 402.

The backtracking of the user's movement trajectory, implemented in accordance with the present subject matter, can be generally performed for locating users within the indoor space and thus discovering group dynamics within an indoor environment, say, office environment. Further, the backtracking of the indoor trajectories may be useful for understanding behavioral traits of users from historical data stored in the computing device 104 or in the server 102.

Figure 3B:
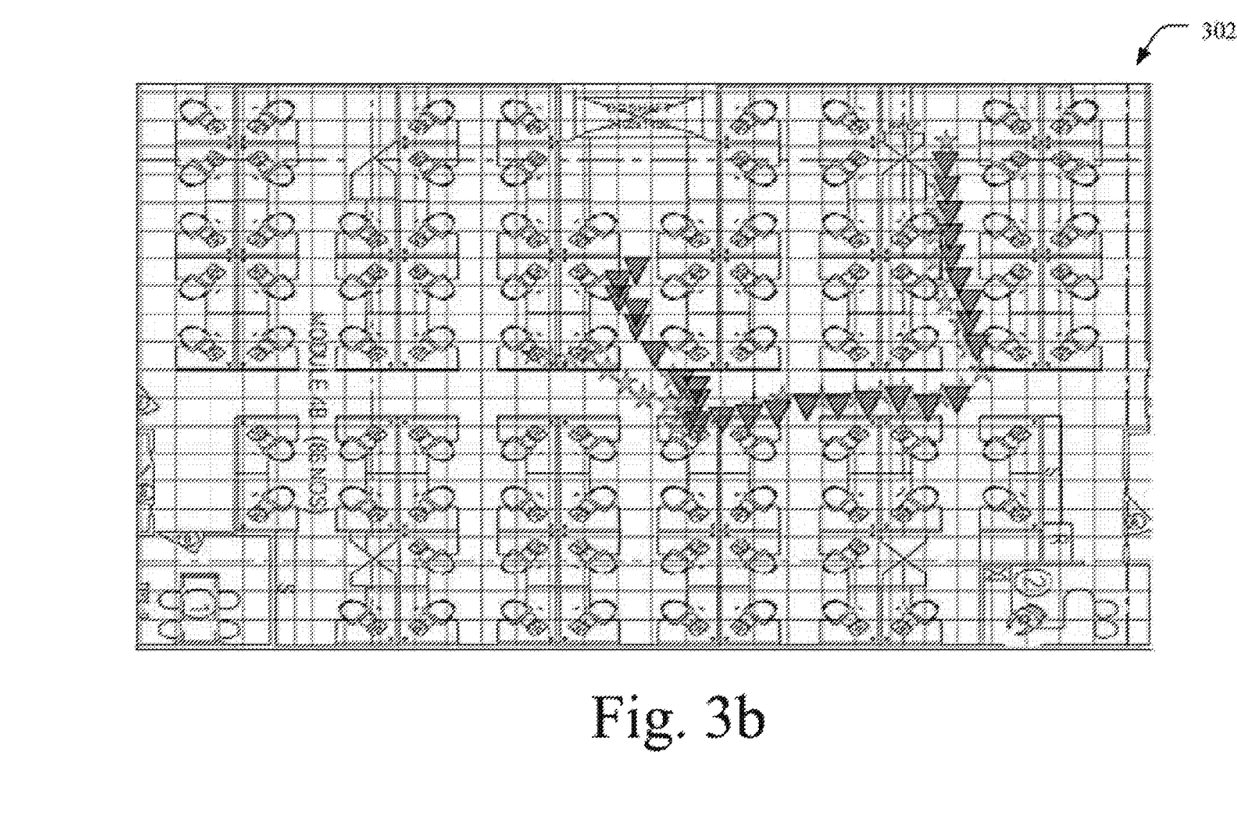
FIG. 3b illustrates a comparison of Viterbi-based backtracking and conventional backtracking for the first example of the user's movement trajectory, according to an implementation of the present subject matter.
Figure 4B:
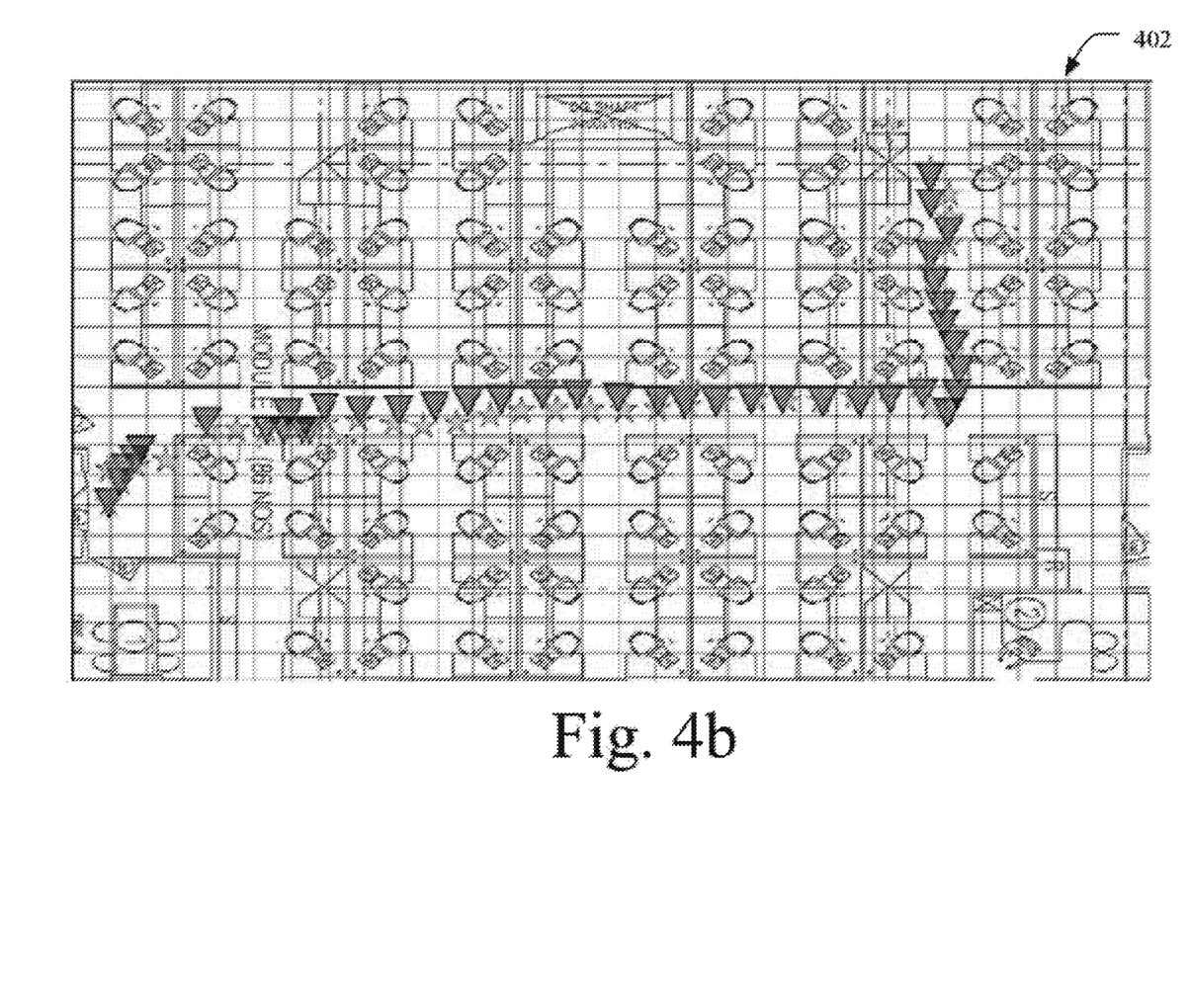
FIG. 4b illustrates a comparison of Viterbi-based backtracking and conventional backtracking for the second example of the user's movement trajectory, according to an implementation of the present subject matter.

FIG. 3b and FIG. 4b illustrate triangle-shaped particles as an output of the Viterbi-based backtracking of the indoor trajectories. Further, as can be seen in FIG. 3b and FIG. 4b, the star-shaped particles are represented by conventional backtracking mechanism. As can be appreciated by a person skilled in the art, the triangle-shaped particles represented with the implementation of the present subject matter backtracks the user's movement trajectories more accurately than the conventional backtracking mechanism

---

ALGORITHM 1: VITERBI ALGORITHM
Input:
   (a) Transition Probability Matrix $A_{N \times N}$
   (b) Observation Density Matrix $O_{N \times T}$
      Initialize $\delta$ (i, 1) = O (i, 1)$\forall$i = 1, 2, ... N
      Initialize $\Psi$ (1) = arg max$_i$ O(i, 1) i $\in$ {1, 2, ... , N}
   For t $\leftarrow$ 2 to T
     1) $\delta$(j, t) = max[$\delta$(i, t – 1) * A(i, j)] O(j, t)$\forall$i, j
     2) $\Psi$(t) = arg max$_i$ [$\delta$(i, t – 1)X A (i, j)] $\forall$i
   End for Output: The array of best state sequence $\Psi$

---

In an implementation, the backtracking module 112 may perform correction of estimated state when particles are abruptly generated at erroneous location. For example, those particles that would run into a wall, such as wall segments, may be corrected by removal from the indoor map 302, 402. Further, in situations when bulk of particles are abruptly generated at erroneous locations in certain steps, a corresponding observation density may lead to faulty state inference. A state sequence matrix LP is then corrected by inspecting every 3 consecutive elements of LP and adjusting their indices. Let A=$\psi$(i+1) and C=$\psi$(i+2) be the three current elements. If a line AB intersects the invalid cells, the location of B is substituted by a point at a mean of a line segment AC. State indices of the points are changes likewise.

In this way, the systems and methods described herein facilitate the integration of Viterbi-based backtracking in particle filter framework to disambiguate between closely resembling multiple paths inferred from real-time Bayesian tracking algorithms like particle filters. Further, the Viterbi-based backtracking in the particle filter framework progressively reduces the uncertainty in the movement track of an individual computing device. Yet further, the systems and methods described herein for unsupervised indoor localization are completely unsupervised, i.e., the systems and methods described herein don't require manual labeling of actual paths travelled by the user carrying the computing device.

Figure 5:
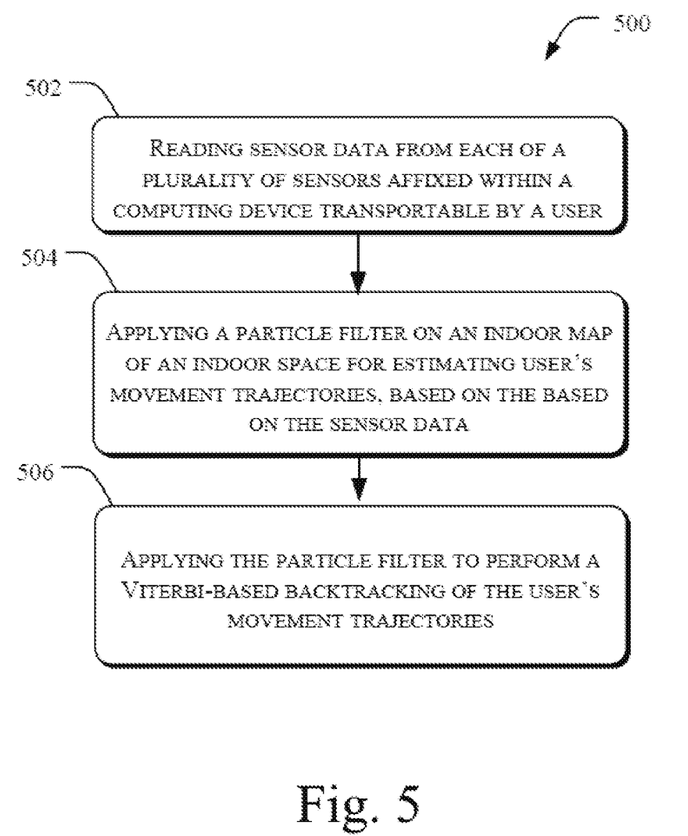
FIG. 5 illustrates an example of method for backtracking the user's movement trajectories, according to an implementation of the present subject matter.

The operation of the computing device 104 is further explained in conjunction with FIG. 5. FIG. 5 illustrates an exemplary method 500 for backtracking of user's movement trajectories, in accordance with an implementation of the present subject matter. The order in which the methods 500 is described is not intended to be construed as a limitation, and any number of the described method blocks can be combined in any order to implement the methods, or alternative methods. Additionally, individual blocks may be deleted from the methods without departing from the spirit and scope of the subject matter described herein.

The methods 500 may be described in the general context of computer executable instructions. Generally, computer executable instructions can include routines, programs, objects, components, data structures, procedures, modules, functions, etc., that perform particular functions or implement particular abstract data types.

A person skilled in the art will readily recognize that steps of the methods 500 can be performed by programmed computers and computing devices. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and computing devices configured to perform said steps of the exemplary methods.

At block 502, sensor data 224 are read from each of a plurality of sensors 208 affixed within a computing device 102 transportable by a user. In an example, based on the sensor data 224, an accelerometer information and a heading information of the computing device 204 with respect to the user are estimated.

At block 504, based on the accelerometer information and a heading information, a particle filtering module 110 applies a particle filter on an indoor map 302, 402 of an indoor space for estimating user's movement trajectories. In an example, the user's movement trajectory is estimated in real-time. That is, the user's movement trajectory is estimated instantly when the user starts moving in the indoor space.

At block 506, a backtracking module 112 is called offline to apply the particle filter to perform a Viterbi-based backtracking of the user's movement on the indoor map.

In this way, the systems and methods described herein facilitate the integration of Viterbi-based backtracking in particle filter framework to disambiguate between closely resembling multiple paths inferred from real-time Bayesian tracking algorithms like particle filters.

Although embodiments for methods and systems for the present subject matter have been described in a language specific to structural features and/or methods, it is to be understood that the present subject matter is not necessarily limited to the specific features or methods described. Rather, the specific features and methods are disclosed as exemplary embodiments for the present subject matter.

What is claimed is:

1. A computing device (104) for backtracking user's movement trajectory, the computing device (104) comprising:
    a processor (202);
    a particle filtering module (110), coupled to the processor (202), to apply a particle filter on an indoor map (302, 402) for estimating user's movement trajectory, based on accelerometer information and heading information associated with the computing device (104), the computing device (104) being transportable by a user, wherein the accelerometer information and the heading information are based on reading of sensor data (224) from each of a plurality of sensors (208) of the computing device (104); and
    a backtracking module (112), coupled to the processor (202), to apply the particle filter on the indoor map (302, 402) for performing a Viterbi-based backtracking of the user's movement trajectory on the indoor map (302, 402), wherein the backtracking module (112) is configured to:
        estimate a transition probability matrix of valid particles by taking into account estimates of transition probabilities of the valid particles at each moving step of the user carrying the computing device (104), wherein the valid particles are particles lying in valid cells,
        estimating an observation density matrix of the valid particles by taking into account estimates of observation densities of the valid particles at each moving step of the user carrying the computing device (104);
        combining the valid cells, the transition probability matrix, and the observation density matrix for computing a most probable sequence of the valid cells that explains inertial measurements represented by each valid particle; and
        backtracking the user's movement trajectory on the indoor map (302, 402) of the indoor space, based on the most probable sequence of the valid cells.

2. The computing device (104) as claimed in claim 1, wherein the plurality of sensors comprise accelerometer, compass magnetometer, and gyroscope, wherein the accelerometer provides an acceleration data (228) for estimating the accelerometer information, and the compass magnetometer and the gyroscope provide an orientation data (230), and wherein the heading information is estimated from the acceleration data (228) and the orientation data (230).

3. The computing device (104) as claimed in claim 1, further comprising a preprocessing module (218) to:
    identify the indoor map (302, 402) of an indoor space based on the accelerometer information and the heading information; and
    preprocess the indoor map (302, 402), wherein the indoor map (302, 402) includes a plurality of physical constraints;
    wherein the preprocessing module (218) preprocesses the indoor map (302, 402) by uniformly dividing the indoor map (302, 402) into equal size cells, and wherein cells respecting one of the plurality of constraints are labeled as the valid cells and cells violating one of the plurality of constrains are labeled as invalid cells.

4. The computing device (104) as claimed in claim 3, wherein the particle filtering module (110) estimates the user's movement trajectory by:
   determining a course-level initial location of the computing device (104) on the indoor map (302, 402);
   uniformly distributing particles over the determined initial location on indoor map (302, 402);
   propagating the distributed particles based on the sensor data (224) and the plurality of constraints;
   progressively updating the distribution of particles on the indoor map (302, 402), based on validity of the propagated particles; and
   based on the progressive updating, estimating the user's movement trajectory.

5. The computing device (104) as claimed in claim 1, wherein the backtracking module (112) estimates the transition probability matrix and the observation density matrix, in parallel to the estimation of the user's movement trajectory.

6. The computing device (104) as claimed in claim 1, wherein the particle filter is a real-time Bayesian tracking algorithm.

7. The computing device (104) as claimed in claim 6, further corrects estimated state when particles are abruptly generated at invalid cells.

8. The computing device (104) as claimed in claim 1, wherein an output of the Viterbi algorithm is a sequence of the valid cells on the indoor map (302, 402).

9. The computing device (104) as claimed in claim 1, wherein the Viterbi-based backtracking is performed offline.

10. A method for backtracking user's movement trajectories, the method comprising:
    reading sensor data (224) from each of a plurality of sensors (208) of a computing device (104), the computing device (104) being transportable by a user, wherein based on the sensor data (224), accelerometer information and heading information of the computing device (104) are estimated;
    applying, by a processor (202), a particle filter on an indoor map (302, 402) of an indoor space for estimating the user's movement trajectories on the indoor map (302, 402), based on the accelerometer information and the heading information; and
    applying, by the processor (202), the particle filter on the indoor map (302, 402) for performing a Viterbi-based backtracking of the user's movement trajectories on the indoor map (302, 402), wherein the backtracking of the user's movement trajectories is performed by:
       estimating a transition probability matrix of valid particles by taking into account estimates of transition probabilities of the valid particles at each moving step of the user, wherein the valid particles are particles lying in valid cells,
       estimating an observation density matrix of the valid particles by taking into account estimates of observation densities of the valid particles at each moving step of the user;
       combining the valid cells, the transition probability matrix, and the observation density matrix for computing a most probable sequence of the valid cells that explains inertial measurements represented by each valid particle; and
       backtracking the user's movement trajectory on the indoor map (302, 402) of the indoor space, based on the most probable sequence of the valid cells.

11. The method as claimed in claim 10, wherein the plurality of sensors comprise accelerometer, compass magnetometer, and gyroscope, wherein the accelerometer provides an acceleration data (228) for estimating the accelerometer information, and the compass magnetometer and the gyroscope provide an orientation data (230), and wherein the heading information is estimated from the acceleration data (228) and the orientation data (230).

12. The method as claimed in claim 10, further comprising:
    identifying the indoor map (302, 402) of the indoor space based on the accelerometer information and the heading information; and
    preprocessing the indoor map (302, 402), wherein the indoor map (302, 402) includes a plurality of physical constraints;
       wherein the preprocessing comprising uniformly dividing the indoor map (302, 402) into equal size cells, and wherein cells respecting one of the plurality of constraints are labeled as the valid cells and cells violating one of the plurality of constraints are labeled as invalid cells.

13. The method as claimed in claim 12, further comprising:
    determining a course-level initial location of the computing device (104) on the indoor map (302, 402);
    uniformly distributing particles over the determined initial location on the indoor map (302, 402);
    propagating the distributed particles based on the sensor data (224) and the plurality of constraints;
    progressively updating the distribution of particles on the indoor map (302, 402), based on validity of the propagated particles; and
    based on the progressive updating, estimating the user's movement trajectory.

14. The method as claimed in claim 10, further comprising estimating the transition probability matrix and the observation density matrix, in parallel to the estimation of the user's movement trajectory.

15. The method as claimed in claim 10, wherein the particle filter is a real-time Bayesian tracking algorithm.

16. The method as claimed in claim 15, further comprising correcting estimated state when particles are abruptly generated at the invalid cells.

17. The method as claimed in claim 10, wherein the Viterbi-based backtracking is performed offline.

18. A non-transitory computer-readable medium comprising instructions executable by a processor to:
    apply a particle filter on an indoor map (302, 402) for estimating user's movement trajectory, based on accelerometer information and heading information associated with the computing device (104), the computing device (104) being transportable by a user, wherein the accelerometer information and the heading information are based on reading of sensor data (224) from each of a plurality of sensors (208) of the computing device (104); and
    apply the particle filter on the indoor map (302, 402) for performing a Viterbi-based backtracking of the user's movement trajectory on the indoor map (302, 402), wherein the backtracking of the user's movement trajectories is performed by:
       estimate a transition probability matrix of valid particles by taking into account estimates of transition probabilities of the valid particles at each moving step of the user, wherein the valid particles are particles lying in valid cells, estimating an observation density matrix of the valid particles by taking into account estimates of observation densities of the valid particles at each moving step of the user;

combining the valid cells, the transition probability matrix, and the observation density matrix for computing a most probable sequence of the valid cells that explains inertial measurements represented by each valid particle; and backtracking the user's movement trajectory on the indoor map (302, 402) of the indoor space, based on the most probable sequence of the valid cells.

\* \* \* \* \*